United States Patent
Frank et al.

(10) Patent No.: US 7,360,253 B2
(45) Date of Patent: Apr. 15, 2008

(54) SYSTEM AND METHOD TO LOCK TPM ALWAYS 'ON' USING A MONITOR

(75) Inventors: Alexander Frank, Bellevue, WA (US); Paul England, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 295 days.

(21) Appl. No.: 11/021,021

(22) Filed: Dec. 23, 2004

(65) Prior Publication Data

US 2006/0143446 A1 Jun. 29, 2006

(51) Int. Cl.
G08B 29/00 (2006.01)

(52) U.S. Cl. .................. 726/34; 726/22; 713/164; 713/156

(58) Field of Classification Search ............. 726/22, 726/34; 713/164, 156
See application file for complete search history.

(56) References Cited

U.S. PATENT DOCUMENTS

| | | | |
|---|---|---|---|
| 4,817,094 A * | 3/1989 | Lebizay et al. ............. 714/797 |
| 4,855,922 A * | 8/1989 | Huddleston et al. ........ 700/295 |
| 5,522,040 A * | 5/1996 | Hofsass et al. ............... 714/55 |
| 5,563,799 A * | 10/1996 | Brehmer et al. ............ 702/186 |
| 6,385,727 B1 * | 5/2002 | Cassagnol et al. .......... 713/193 |
| 6,408,170 B1 * | 6/2002 | Schmidt et al. ............. 455/344 |
| 6,871,283 B1 * | 3/2005 | Zurko et al. ................... 726/10 |
| 6,986,042 B2 * | 1/2006 | Griffin ........................ 713/164 |
| 7,000,100 B2 * | 2/2006 | Lacombe et al. .............. 713/1 |
| 7,000,829 B1 * | 2/2006 | Harris et al. ................. 235/379 |
| 7,013,384 B2 * | 3/2006 | Challener et al. ............. 713/2 |
| 7,028,149 B2 * | 4/2006 | Grawrock et al. .......... 711/156 |
| 7,069,442 B2 * | 6/2006 | Sutton et al. ................ 713/179 |
| 7,121,460 B1 * | 10/2006 | Parsons et al. .............. 235/379 |
| 7,127,579 B2 * | 10/2006 | Zimmer et al. ............. 711/163 |
| 7,130,951 B1 * | 10/2006 | Christie et al. ............. 710/261 |
| 7,171,539 B2 * | 1/2007 | Mansell et al. ............. 711/203 |
| 7,207,039 B2 * | 4/2007 | Komarla et al. ............ 717/178 |
| 7,236,455 B1 * | 6/2007 | Proudler et al. ............ 370/230 |
| 2002/0023212 A1 * | 2/2002 | Proudler ...................... 713/164 |
| 2002/0124212 A1 * | 9/2002 | Nitschke et al. .............. 714/55 |
| 2002/0184482 A1 * | 12/2002 | Lacombe et al. .............. 713/1 |
| 2003/0084285 A1 * | 5/2003 | Cromer et al. ............. 713/164 |
| 2003/0084337 A1 * | 5/2003 | Simionescu et al. ........ 713/200 |
| 2003/0126519 A1 * | 7/2003 | Odorcic ....................... 714/55 |
| 2003/0188165 A1 * | 10/2003 | Sutton et al. ............... 713/176 |

(Continued)

OTHER PUBLICATIONS

"TCG Specification Architecture Overview," publication dated Apr. 28, 2004, 54 pages.

Primary Examiner—Nasser Moazzami
Assistant Examiner—David Garcia Cervetti
(74) Attorney, Agent, or Firm—Marshall, Gerstein & Borun LLP

(57) ABSTRACT

A computer may be secured from attack by including a trusted environment used to verify a known monitor. The monitor may be used to determine a state of the computer for compliance to a set of conditions. The conditions may relate to terms of use, such as credits available for pay-per-use, or that the computer is running certain software, such as virus protection, or that unauthorized peripherals are not attached, or that a required token is present. The monitor may send a signal directly or through the trusted environment to a watchdog circuit. The watchdog circuit disrupts the use of the computer when the signal is not received in a given timeout period.

9 Claims, 7 Drawing Sheets

U.S. PATENT DOCUMENTS

| | | | |
|---|---|---|---|
| 2004/0093508 A1* | 5/2004 | Foerstner et al. | 713/200 |
| 2004/0199769 A1* | 10/2004 | Proudler | 713/169 |
| 2004/0255000 A1* | 12/2004 | Simionescu et al. | 709/208 |
| 2005/0028000 A1* | 2/2005 | Bulusu et al. | 713/200 |
| 2005/0039013 A1* | 2/2005 | Bajikar et al. | 713/172 |
| 2005/0108564 A1* | 5/2005 | Freeman et al. | 713/200 |
| 2005/0138370 A1* | 6/2005 | Goud et al. | 713/164 |
| 2005/0138389 A1* | 6/2005 | Catherman et al. | 713/185 |
| 2005/0141717 A1* | 6/2005 | Cromer et al. | 380/277 |
| 2005/0166051 A1* | 7/2005 | Buer | 713/173 |
| 2005/0182940 A1* | 8/2005 | Sutton et al. | 713/179 |
| 2005/0216577 A1* | 9/2005 | Durham et al. | 709/223 |
| 2005/0221766 A1* | 10/2005 | Brizek et al. | 455/73 |
| 2005/0235141 A1* | 10/2005 | Ibrahim et al. | 713/164 |
| 2005/0246521 A1* | 11/2005 | Bade et al. | 713/150 |
| 2005/0246525 A1* | 11/2005 | Bade et al. | 713/164 |
| 2005/0246552 A1* | 11/2005 | Bade et al. | 713/193 |
| 2005/0257073 A1* | 11/2005 | Bade et al. | 713/193 |
| 2006/0010326 A1* | 1/2006 | Bade et al. | 713/176 |
| 2006/0015717 A1* | 1/2006 | Liu et al. | 713/164 |
| 2006/0015718 A1* | 1/2006 | Liu et al. | 713/164 |
| 2006/0015732 A1* | 1/2006 | Liu | 713/176 |
| 2006/0026418 A1* | 2/2006 | Bade et al. | 713/150 |
| 2006/0026419 A1* | 2/2006 | Arndt et al. | 713/150 |
| 2006/0026422 A1* | 2/2006 | Bade et al. | 713/164 |
| 2006/0072748 A1* | 4/2006 | Buer | 380/44 |
| 2006/0072762 A1* | 4/2006 | Buer | 380/277 |
| 2006/0075223 A1* | 4/2006 | Bade et al. | 713/162 |
| 2006/0085637 A1* | 4/2006 | Pinkas | 713/168 |
| 2006/0085844 A1* | 4/2006 | Buer et al. | 726/4 |
| 2006/0090084 A1* | 4/2006 | Buer | 713/189 |
| 2006/0100010 A1* | 5/2006 | Gatto et al. | 463/29 |
| 2006/0112267 A1* | 5/2006 | Zimmer et al. | 713/164 |
| 2006/0117177 A1* | 6/2006 | Buer | 713/155 |
| 2006/0129824 A1* | 6/2006 | Hoff et al. | 713/176 |
| 2006/0136717 A1* | 6/2006 | Buer et al. | 713/155 |
| 2006/0143431 A1* | 6/2006 | Rothman et al. | 713/2 |

* cited by examiner

SYSTEM AND METHOD TO LOCK TPM ALWAYS 'ON' USING A MONITOR

BACKGROUND

A trusted platform module (TPM) for use in computing devices such as personal computers is known. The purpose of a TPM is to provide computer identity and secure services related to transactions, licensing of application and media, protecting user data, and special functions.

Trusted platform modules are commercially available, for example, a TPM is available from STM Microelectronics, the ST19WP18 module. The TPM stores keys and subsequently uses those keys to authenticate application programs, Basic Input/Output System (BIOS) information, or identities. However, use of the TPM is voluntary and according to current and anticipated standards and implementations cannot be used to mandate a condition on the computing device. Some business models assume the computer is out of the direct control of the computer owner/supplier, for example, a pay-per-use business model. In such an instance, circumvention of TPM services may be possible, and if circumvention occurs, may have an undesirable negative impact on the business.

SUMMARY

A trusted platform module (TPM) may be used to authenticate a monitor program that enforces conditions on a computing device. Owner keys injected or written to the TPM may be used to require that a monitor approved by the owner is operational. In turn, the approved monitor has access to resources of the TPM by way of monitor's authenticated status. Such a secure resource of the TPM may be, for example, a general purpose input/output (GPIO) port. A simple watchdog timer may be configured to reset the computer on a timed interval unless the watchdog timer is restarted within the interval period by a signal received using the GPIO.

By configuring the computer in this manner, the TPM may be used to help ensure a known monitor is running, and the watchdog timer may be used to help ensure that neither the monitor nor the TPM are disabled or tampered.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
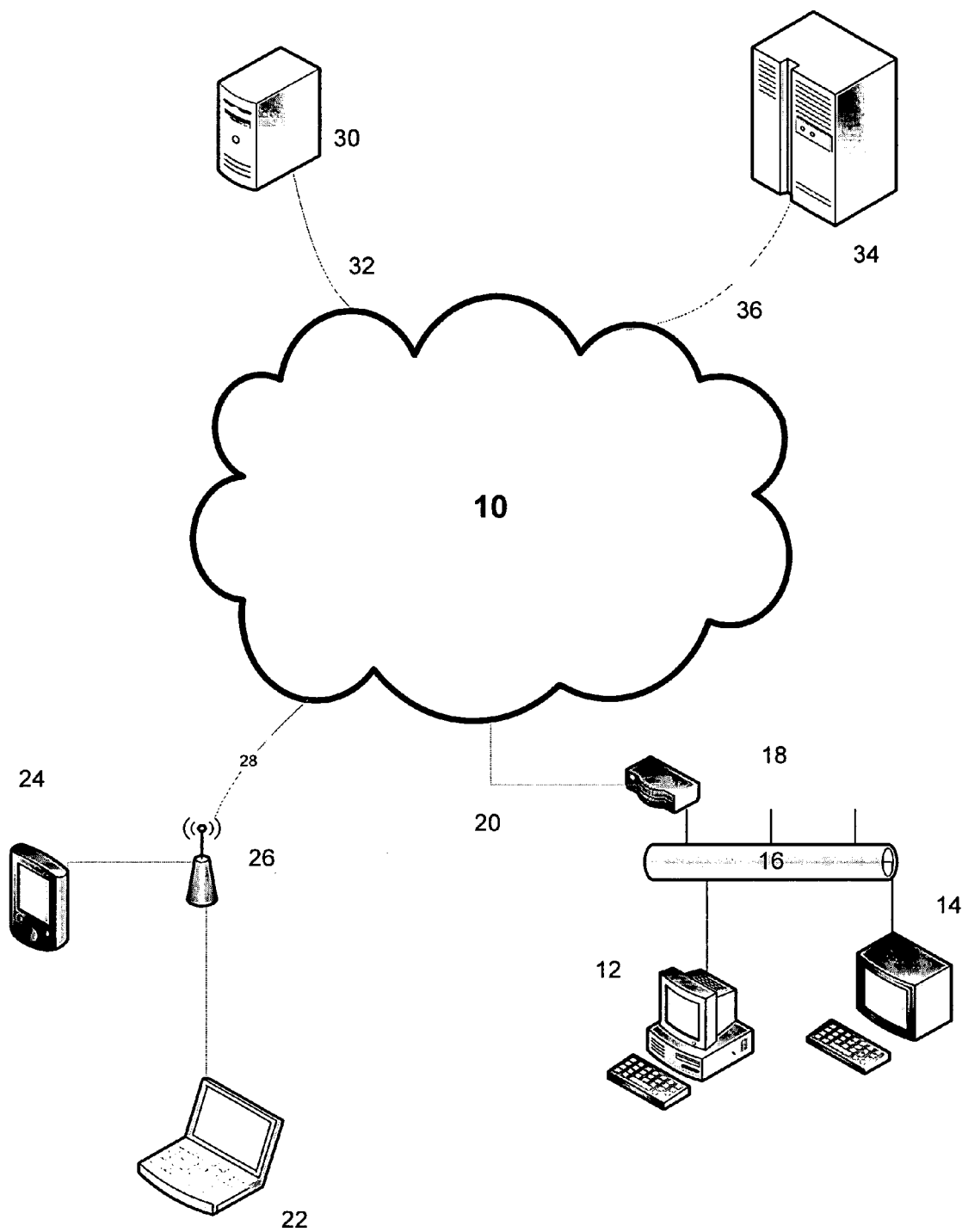
FIG. 1 is a block diagram of a network interconnecting a plurality of computing resources.

FIG. 1 illustrates a network 10 that may be used to implement a dynamic software provisioning system. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet connection 16, a router 18, and a landline 20. On the other hand, the network 10 may be wirelessly connected to a laptop computer 22 and a personal digital assistant 24 via a wireless communication station 26 and a wireless link 28. Similarly, a server 30 may be connected to the network 10 using a communication link 32 and a mainframe 34 may be connected to the network 10 using another communication link 36.

Figure 2:
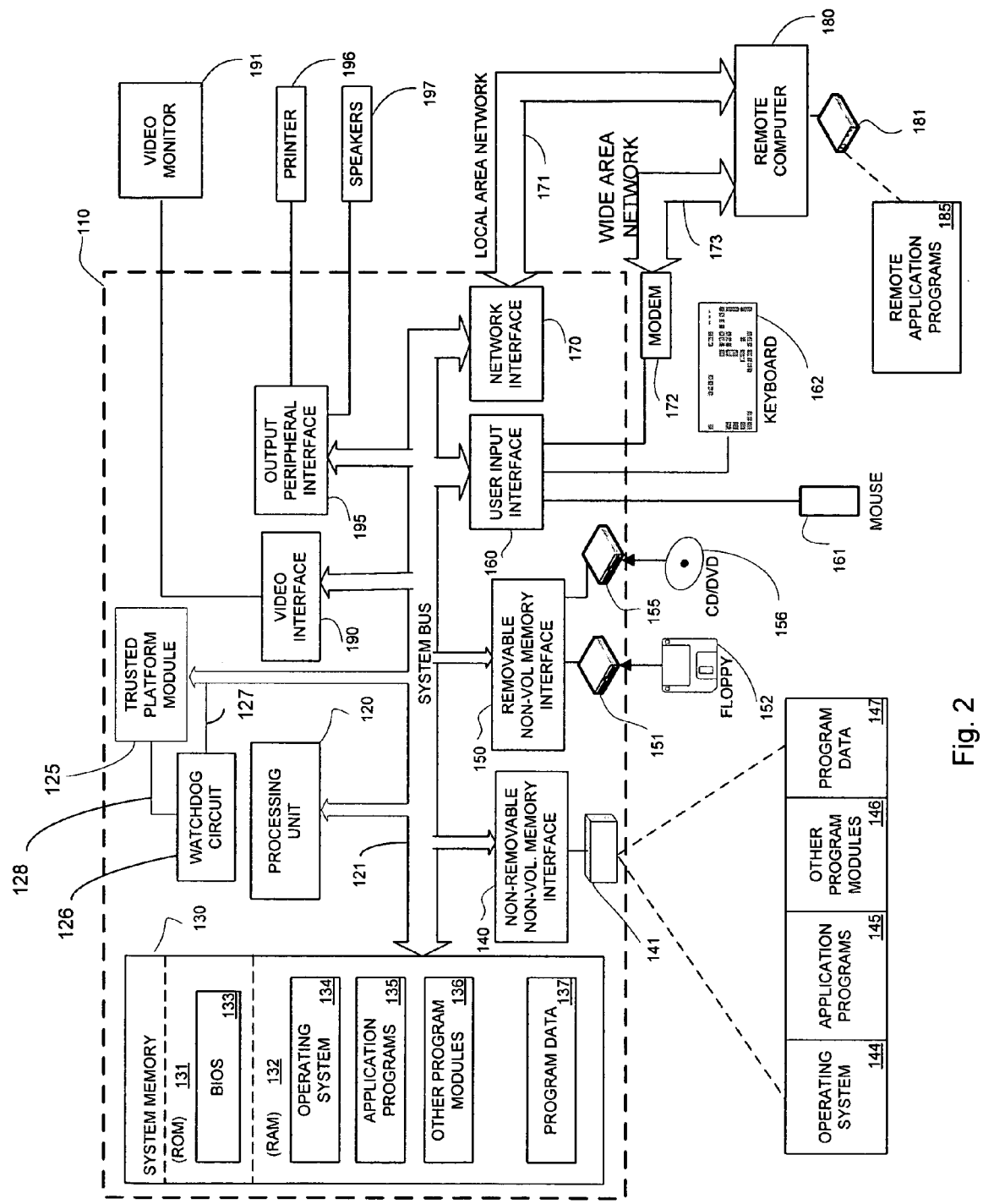
FIG. 2 is a simplified and representative block diagram representative of a computer in accordance with an embodiment of the current disclosure.

FIG. 2 illustrates a computing device in the form of a computer 110. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152 and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not united to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A cathode ray tube 191 or other type of display device s also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181.

The communications connections 170 172 allow the device to communicate with other devices. The communications connection 170 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

The trusted platform module 125 or other trusted environment, discussed in more detail below, may store data, and keys and verify executable code and data. The trusted platform module specification states in section 4.5.2.1, "As part of system initialization, measurements of platform components and configurations will be taken. Taking measurements will not detect unsafe configurations nor will it take action to prevent continuation of the initialization process. This responsibility rests with a suitable reference monitor such as an operating system." Because the TPM is not defined as an enforcement tool the further enhancements described below supplement the common TPM.

A watchdog circuit 126 may be configured to measure a period of time and when the time expires trigger a signal 127 that disrupts the operation of the computer 110. The disruption may be a system reset that causes the computer 110 to reboot. The disruption may interrupt data on the system bus 121 or a peripheral bus. To prevent the watchdog 126 from disrupting the operation of the computer 110, a signal over communication connection 128 may be required to reset the period of time and start the timing process again. As shown in FIG. 2, the watchdog timer reset signal may be carried over communication connection 128. As discussed more below, the TPM 125 may initiate the watchdog timer reset responsive to a signal from a monitor program. The steps described in the following may be used to help ensure that a specific, desired, monitor is present and operating by using the combination of the TPM 125 and watchdog circuit 126.

Figure 3:
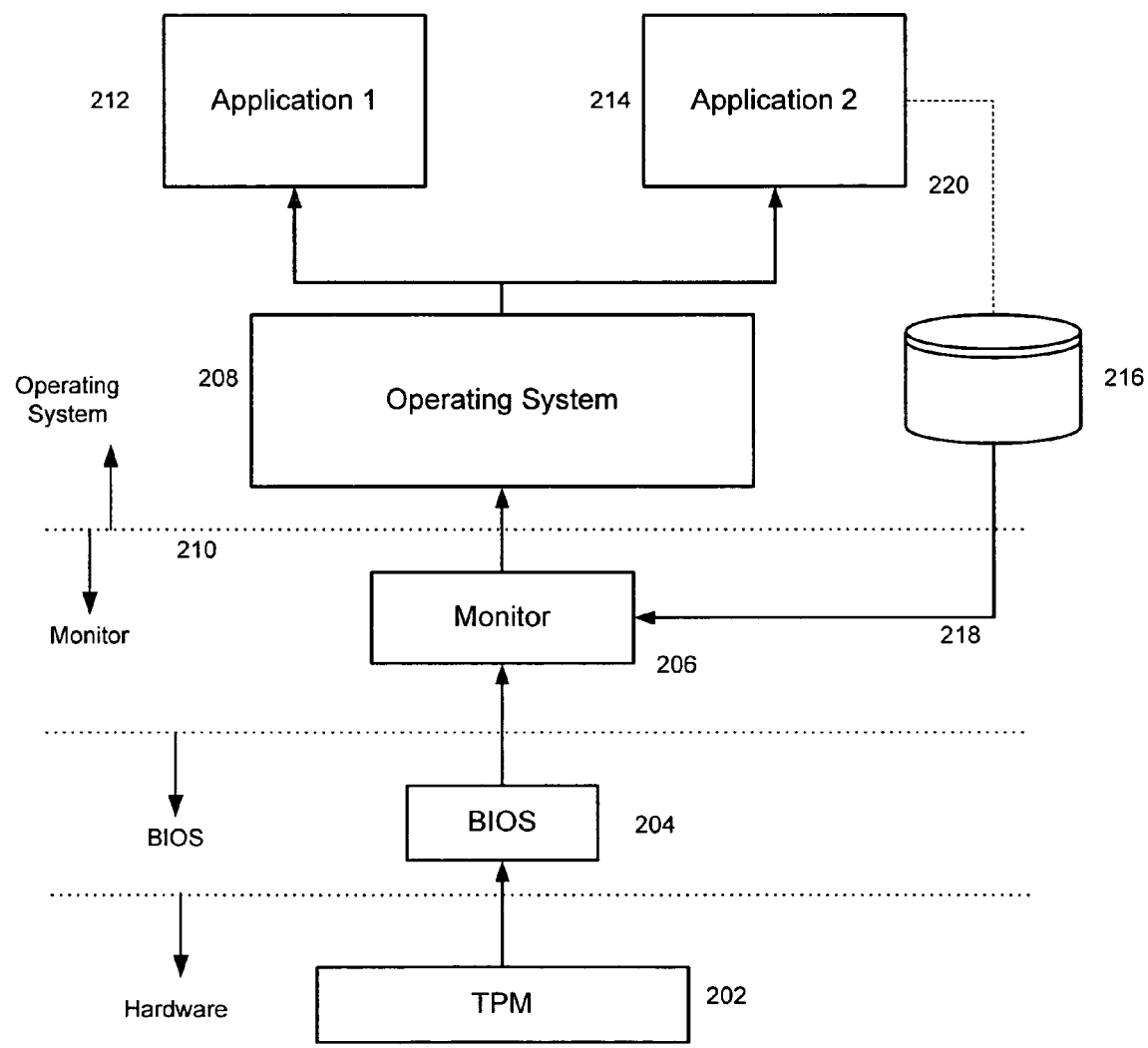
FIG. 3 is a simplified and representative block diagram showing a hierarchical representation of functional layers within the computer of FIG. 2.

FIG. 3, a simplified block diagram showing a hierarchical representation of functional layers within a representative computer such as that of FIG. 2, is discussed and described. A trusted platform module 202 may be hardware that resides below the basic input/output structure (BIOS) 204. The TPM 202 may act as a resource to the computer and higher level operations, such as the BIOS 204. The BIOS may activate a monitor 206. The monitor 206 resides below the operating system 208 at the monitor level 210. The monitor 206 may access and use resources of the TPM 202 to carry out policies associated with the operation of higher level entities. The operating system 208 supports the major functions of the computer 110 and may be responsible (after initial bootstrap processes hand over control) for communication, user input/output, disk and other memory access, application launch, etc. The operating system may also directly access and use the TPM 202. As shown, first and second applications 212 214 may run on the operating system 208. In some cases, the monitor may enforce policies related to both the operating system 208 and the applications 212 214. For example, before application 214 may be launched from disk 216, the operating system may check licensing status, depicted by line 218, to determine if the application 214 meets a given criteria for launching. The criteria for launch and subsequent metering of applications using a monitor function are discussed in more detail in US patent application "Method for Pay-As-You-Go Computer and Dynamic Differential Pricing" filed on Dec. 8, 2004 as Ser. No. 11/006,837. Briefly, the monitor 206 may be used to measure and meter application programs, utilities and computer resources, for example, in a pay-per-use or pre-paid scenario.

Figure 6:
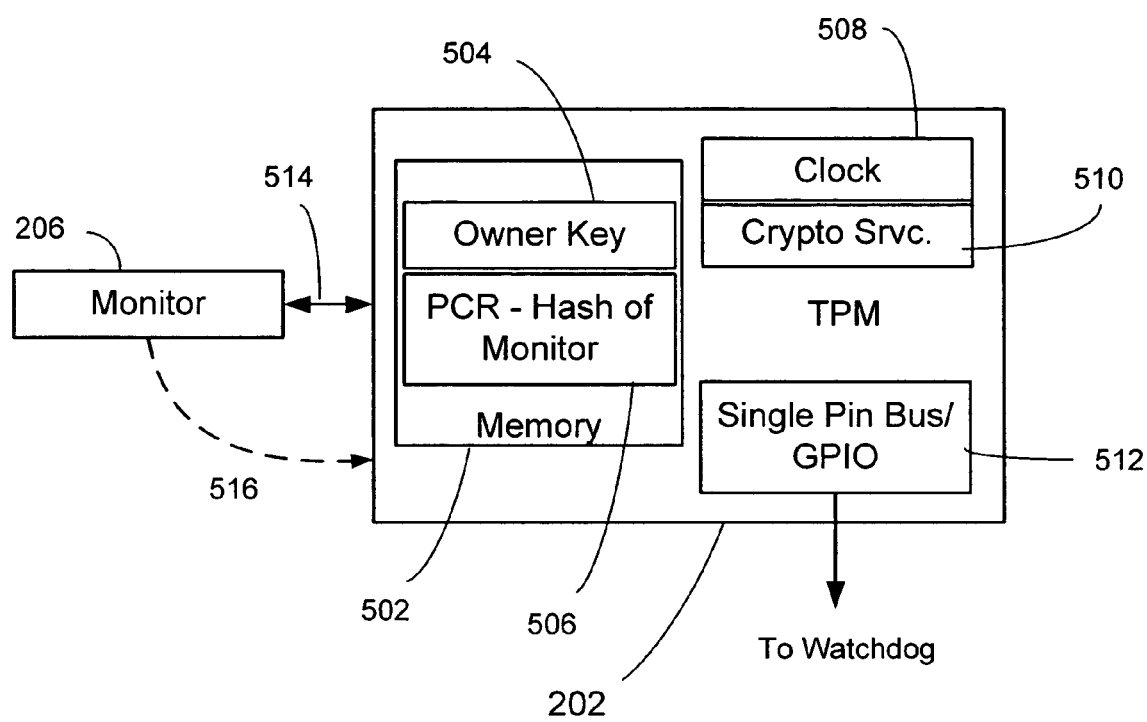
FIG. 6 is simplified and representative block diagram of the TPM.

Referring briefly to FIG. 6, the TPM 202 is discussed in more detail. The TPM 202 may have an internal memory 502 comprising both volatile and non-volatile memory, at least part of which may be secure from tampering or unauthorized write operations. The memory may store an owner key 504 for use in validating entities that claim affiliation with the owner for the purpose of configuring the TPM 202 and for establishing trust with an outside entity. The memory may also include, among other things, a platform configuration register (PCR) 506. The PCR 506 may be used to store a hash or other strong identifier associated with the monitor 206. The TPM 202 may also include a clock 508 and cryptographic services 510. Both may be used in the authentication and authorization processes as will be discussed below in more detail. The TPM 202 may also include a bus 512, sometimes referred to as a Single-pin Bus or general purpose input/output (GPIO). In one embodiment, the GPIO 512 may be coupled to the watchdog circuit, as described elsewhere.

The TPM 202 may also be coupled to a general purpose bus 514 for data communication within the computer, for example, a process running the monitor 206. Using the bus 514, or in some cases another mechanism 516, the TPM 202 may be able to measure the monitor. The measurement of the monitor may include checking a cryptographic hash of the monitor, that is, checking a hash of the memory range occupied by the monitor. The PCR may be used to store the measurement data 506. The owner key 504 may be affiliated with the hash of the monitor 506, for example, by a digitally signed hash of the monitor that requires the owner key 504 for confirmation. The owner key 504 may be written or injected into the TPM 202 at the time of manufacture, or later, for example, at the time of delivery to a customer. The owner key 504, then, is used to authenticate the monitor 206.

In an exemplary embodiment, the monitor 206 is measured by a trusted module preceding it in the boot sequence, for example, by the BIOS 204. The monitor measurement, such as a hash computed by the BIOS 204, may be stored in the TPM PCR 506 via the bus 514. When the TPM 202 validates the measurement (hash), the TPM 202 may then allow access to the monitor 206 unique keys and/or other secrets allocated to the monitor 206 and stored in the TPM 202. The TPM 202 will allocate to any monitor corresponding keys and secrets to whatever measurement the monitor's measurement matches.

The TPM may be programmed with an owner key 504 and a corresponding monitor metric 506, i.e. a hash of a known monitor 206. The owner key is used to program or update the monitor metric 506, such that only the entity in possession of the owner key 504 may set the PCR register 506 for the known monitor 206. The standard TPM 202 has a characteristic that only a monitor 206 verified against a given measurement 506 may have control of the GPIO 512. When the GPIO 512 is connected in a tamper-resistant manner to the watchdog circuit 126, a chain of trust may be completed. That is, only a verified monitor 206 may control the GPIO 512 and only the GPIO 512 may be used to restart the watchdog circuit 126. Therefore, while the monitor 206 may be replaced or altered, only the monitor 206 verified by PCR 506 set by the owner key 506 may be used to restart the timer of the watchdog circuit 126. Thus only the authorized monitor may be used to prevent the watchdog from disrupting the computer 110 by, for example, resetting, the computer 110. The timer of the watchdog circuit 126 may be set to a period selected to allow restoration of a corrupted or tampered computer 110, but short enough to prevent significant useful work to be done on the computer 110. For example, the watchdog may be set to disrupt the computer 110 every 10-20 minutes, unless restarted by the validated monitor 206.

The owner secret 504 and the monitor measurement 506 may be programmed in a secure manufacturing environment, or may be field programmed using transport keys known to the entity programming the owner key 504. Once the owner key 504 is known, the programming entity, for example, a service provider, may set the measurement of the monitor that will determine what monitor is given access to the GPIO bus. The owner key 504 may be required to re-program the owner key. The use of derived keys may facilitate key distribution, scaling and protection from widespread loss should a local owner key 504 be compromised. Key management techniques are known in the data security arts.

Figure 4:
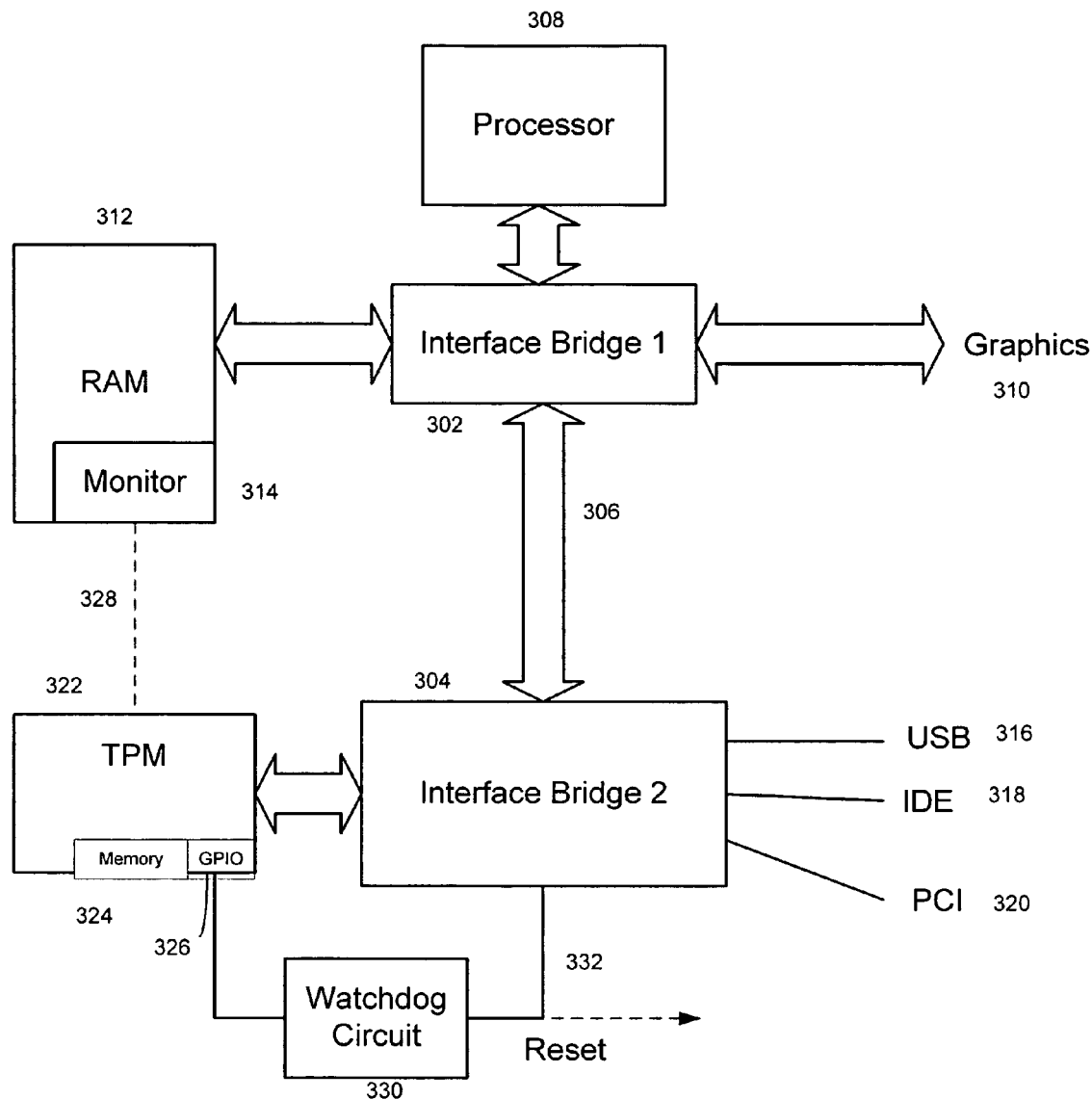
FIG. 4 is a simplified and representative block diagram of a computer architecture of the computer of FIG. 2.

FIG. 4 is a block diagram of a representative architecture of a computer 300, the same or similar to computer 110. The computer may have a first and second interface bridges 302 304. The interface bridges 302 304 may be connected by a high speed bus 306. The first interface bridge 302 may be connected to a processor 308, graphics controller 310 and memory 312. The memory 312 may host a monitor program 314, as well as other general purpose memory uses.

The second interface bridge 304 may be connected to peripheral buses and components, for example, universal serial bus (USB) 316, Integrated Drive Electronics (IDE) 318, or Peripheral Component Interconnect (PCI) 320, used to connect disk drives, printers, scanners, etc. The second interface bridge may also be connected to a TPM 322. As discussed above, the TPM 322 may have secure memory 324 for key and hash data, and a general purpose input/output (GPIO) 326. The TPM 322 may be physically or logically coupled to the monitor by connection 328. As discussed, the BIOS 204 may measure the monitor 206 and store the measurement in the TPM 322, which allocates to the monitor 314 keys and secrets corresponding to the provided measurement. The monitor 314 is therefore given access to the resources and data locked with these keys and secrets. The connection 328 may also be used by the monitor to control the GPIO 326 for the purpose of sending a signal to the watchdog circuit 330. The signal may cause the watchdog to reset. When the signal is not received by the watchdog circuit 330 in a time period proscribed by a setting in the watchdog circuit 330, a reset, or other disruptive signal may be sent over connection 332. To discourage tampering, the connection between the GPIO 326 and the watchdog circuit 330 may be protected, for example, by potting or routing between circuit board layers to prevent manual restarting of the watchdog circuit 330. The computer reset signal connection 332 may be similarly protected from tampering, or at least a portion of the reset signal connection 332 between the watchdog circuit 330 and the main processor computer reset point (not depicted).

Figure 5:
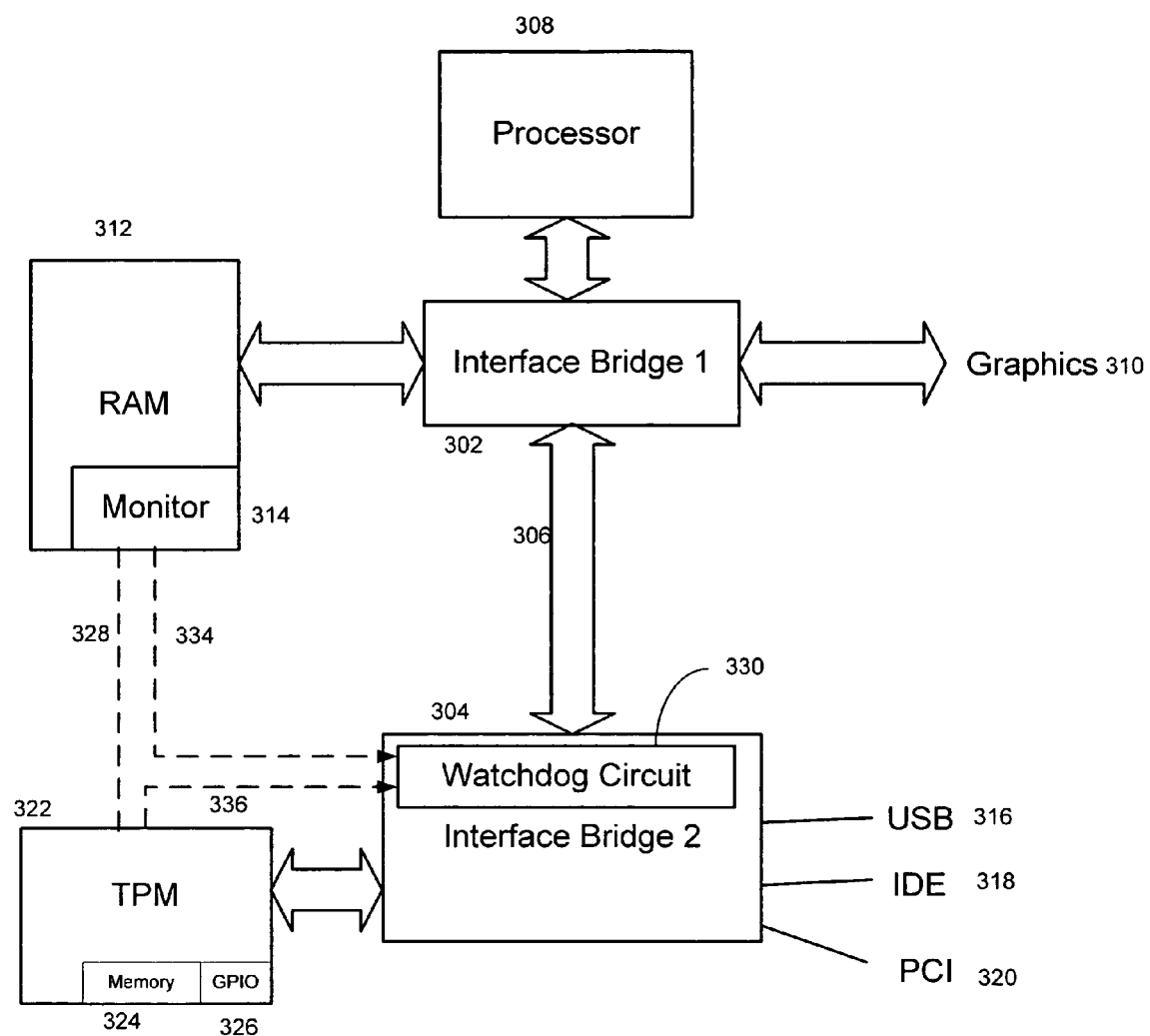
FIG. 5 is a simplified and representative block diagram of an alternate computer architecture of the computer of FIG. 2.

FIG. 5 is a representative block diagram of an alternate architecture of the computer of FIG. 2. Comparing to the description of FIG. 4, like numbered components are the same. The watchdog circuit 330 has been moved into the second interface bridge 304 showing a representative illustration of how the watchdog circuit 330 may be combined into another circuit to improve tamper resistance. The integration of the watchdog circuit 330 to the second interface bridge chip 304, while itself appropriate, is only illustrative. Since the second interface bridge 304 is a major component of the computer architecture, the desired level of disruption may be carried forth from within the second interface bridge 304. Therefore, a connection from a watchdog circuit external to the second interface bridge 304, such as connection 332, may not be required.

In this alternate architecture, the GPIO 326 may not be used to signal the reset to the watchdog circuit 330. Instead, a message may be sent over logical connection 334 directly from the monitor 314 to the watchdog circuit 330.

Because a sufficient level of trust may not exist between the two entities (314 330) the message may be signed using keys held in the TPM 322. For example, these keys may be associated with the monitor 314 during first boot (e.g. on the manufacturing line—for the sake of trustworthiness). Keys may be assigned arbitrarily, or, as mentioned above, keys may be hierarchically derived from a master key and known data such as a root certificate, serial number or manufacturing sequence number, etc. The watchdog timer 330 may be configured to respect only messages signed using these keys, for example, during the first boot of the computer 110 on the assembly line. In addition, the monitor locks these keys into the TPM 322, such that only a monitor 314 identically measured has access to these keys. A variant of this architecture is that the monitor relies on the TPM 322 to allocate it these keys uniquely and respectively to its measurement.

During normal operation the monitor 314 may request the TPM 322 to sign on its behalf the message to be sent to the watchdog timer 330. The TPM 322 signs the message with the keys that correspond to the monitor 314 (per its measurement that was stored into the TPM 322 by the BIOS during each boot). The monitor 314 may receive the signed message from the TPM 322 over logical connection, for example, connection 328 and then provide it to the watchdog circuit 330 over logical connection 334.

When the watchdog circuit 330 receives the message, the watchdog circuit 330 may use the keys (set during manufacturing) to authenticate the message. Alternately, it may request verification using key or secret in the TPM 322 using logical connection 336. If another monitor is running, it will measure differently, resulting in different keys & secrets being allocated by the TPM. Therefore, the alternate monitor will not be able to sign the message properly such that it will be authenticated by the watchdog circuit 330. Consequently, the watchdog circuit 330 will initiate a sanction, such as firing a reset of the computer 110 after the expiration of its timing interval. The use of signed or encrypted messages may reduce the opportunity for attacks on the logical connections 328 and 334.

Figure 7:
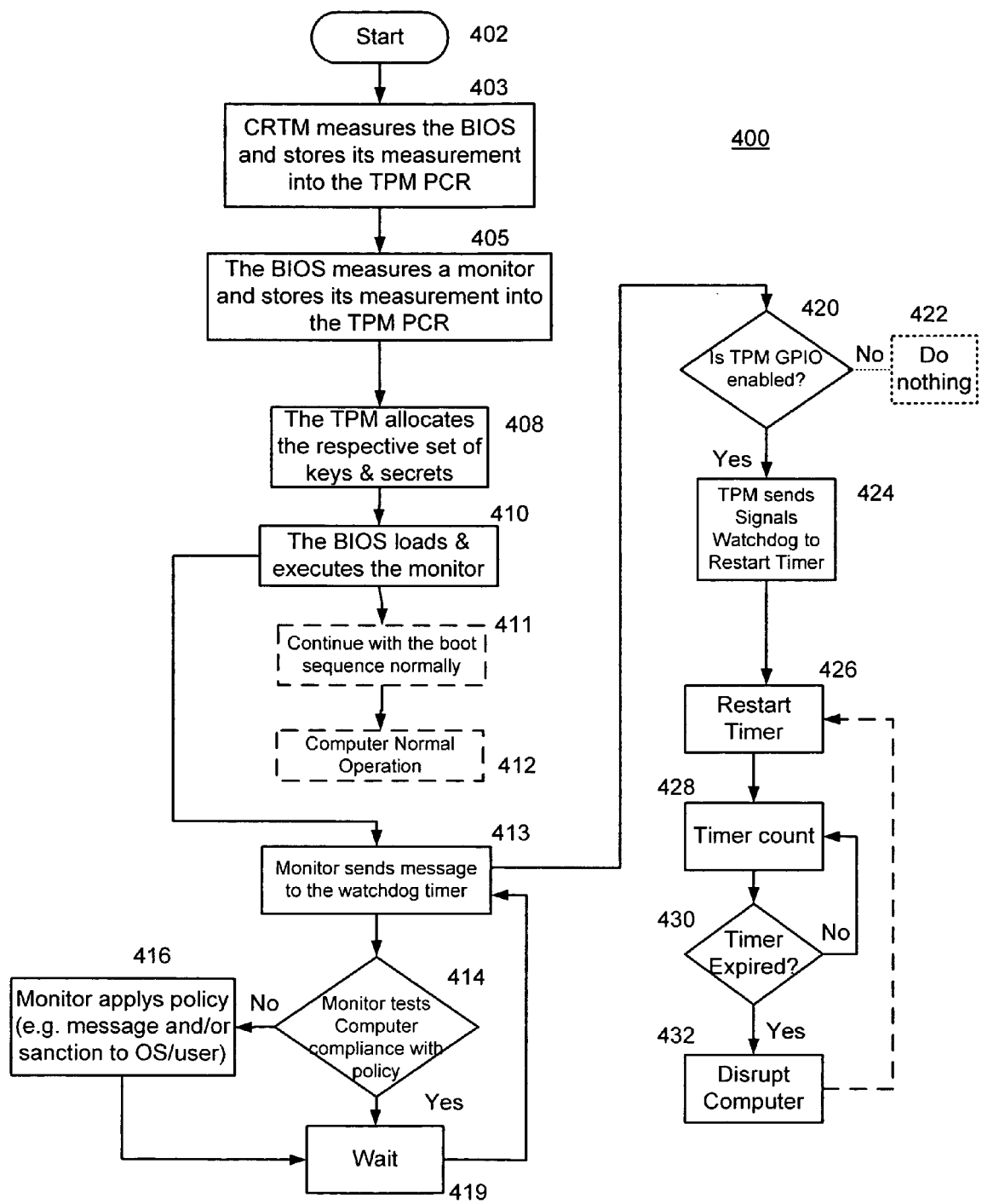
FIG. 7 is a flow chart depicting a method of locking-on a TPM using a monitor.

FIG. 7, a flowchart illustrating a method to lock a trusted platform module (TPM) always "on" using monitor, is discussed and described. A typical TPM, for example, TPM 125 may be optionally enabled by the user. As described below, the method will help ensure that both the TPM 125 remains enabled, and that a monitor 206 selected by the owner of the business will be executed, at the risk of sanctions such as disabling the computer 110.

Starting with application of power at the start 402, the computer 110 may initiate the various hardware components through normal boot mechanisms. This applies to the TPM 322 as well. The boot sequence may follow a Trusted Computing Platform Alliance (TCPA) methodology. The Core Root of Trust for Measurements(CRTM) (not depicted) measures the BIOS 133 and stores 403 its measurement into the TPM 322. Then the CRTM loads and executes the BIOS 133. (The CRTM may ideally be stored in a trustworthy location in the computer 110 which is very difficult to attack).

The BIOS 133 may execute in a conventional fashion, initiating and enumerating various computer components, with one exception—it may measure each software module before loading and executing it. Also, it may store these measurements into the TPM 322. Particularly, it may measure the monitor 314 and store 405 the monitor measurement into the TPM 322.

The TPM 322 allocates 408 keys and secrets uniquely and respectively to the monitor measurement. The essence is that the TPM 322 consistently allocates 408 unique keys & secrets that correspond to a given measurement. Consequently, the secrets available to a monitor 314 are unique, consistent and respective. As a result any monitor may lock resources such that will be exclusively available only to that particular monitor. For example, this enables the linking of the genuine monitor 314 to the watchdog circuit 330 by programming the GPIO 326 connected to the watchdog circuit 330 to respect only the measurement associated with the genuine monitor 314. The GPIO 326 is then available only to a monitor that measures identically to the genuine monitor 314.

Regardless of whether the loaded monitor is genuine or not, the boot sequence loads and executes 410 the monitor. The normal boot process may continue 411 and assuming a successful boot, normal operation 412 of the computer 110 follows.

As soon as the monitor 314 is loaded and executed at 410 it starts its loop (413-419). First, the monitor 314 sends 413 a message to the watchdog circuit 330 via the TPM GPIO 326. The message may signal the TPM 322 to use the GPIO 326 to signal the watchdog circuit 330 to restart its timer (not depicted).

After sending the message to the TPM 322, the monitor returns to the testing state 414. The monitor may test 414 that the state of the computer 110 complies with a current policy. The current policy may involve the specific presence or absence of known programs, utilities or peripherals. The test may also be related to metering or other pay-per-use metrics. For example, the test may check for available provisioning packets for consumption vs. specific application program operation. In another embodiment, the test may be related to operation during a specific time period, such as calendar month.

When the test 414 fails, the No branch may be followed 416, where the monitor acts in accordance with the policy. The action may be just a warning code sent to the operating system or a warning message presented to user. The action may be some sanction imposed on the operating system and user, e.g. limiting or eliminating a certain function of the computer. This may apply to hardware and/or software functions. For instance, the computer may be slowed down, certain software may be disabled, or certain devices may be disabled, e.g. a webcam. More severe sanctions may be to limit the amount of RAM available to the OS, or to reduce the Instruction-Set-Architecture available to the operating system. In an exemplary embodiment, one course of action available to the monitor 314 when a non-compliant condition is found may be to not take action to restart the timer of the watchdog circuit 330 and let the watchdog circuit 330 impose a sanction.

When the test succeeds, the Yes branch from 414 may be followed. In either case, execution waits 419 for an interval before returning to step 413. The wait interval avoids exhausting the computer's resources by repeatedly running the monitor 314. Obviously, this wait interval 419 should be some fraction of the watchdog timer counting period. The determination of a usable fraction may be the likelihood that normal operation of the computer would delay execution completion of the loop. Then the loop returns to step 413 discussed above. The period for repeating the loop may be set to any time less than the watchdog circuit timeout period, otherwise an unwarranted disruption may take place.

When the TPM 322 receives 420 the message, the TPM 322 acts according to the monitor measurement. If the measurement is deemed non-genuine 420 fails, the No branch may be taken to box 422, which takes no action, i.e. the signal to the watchdog circuit 330 is not sent. No further action may be needed by the TPM 322 because the watchdog circuit 330 will disrupt the computer 110 unless steps are taken to stop it. Optionally, the TPM 322 may, at 422, generate an error for logging generate a warning/error code, notify the operating system and may display a message to the user.

When the TPM 322 verifies that the monitor measurement is genuine, the GPIO 326 may be activated to signal 424 the watchdog circuit 330 to restart its timer. As discussed above, restarting the watchdog circuit timer prevents the watchdog circuit 330 from initiating a disruptive action, such as a reset of the computer 110. The watchdog circuit 330 may then restart 426 the timer at its initial value. The timer will then count 428 and test 430 for expiration of a pre-determined time. The timer period may be settable. Timer implementation is known and whether the timer counts up to a given number, down to zero, counts to a set clock time, or other mechanism, is a design choice.

If the timer has not expired, the no branch from 430 may be taken back to 428, which will take another count from the timer. When time has expired, the yes branch from 430 may be taken and the watchdog may enforce a sanction by disrupting 432 the computer. The disruption may be a system reset, causing a re-boot, disabling of peripherals, etc. The period for the watchdog circuit timer to count down to a disruption 432 may be enough to allow a user to correct a non-compliant condition on the computer 110, but should be frequent enough to restrict reliable or useful activity on the computer 110.

The link from 432 to 426 may be conceptual. If the disruption is implemented by a reset of the whole computer, this link is moot. In the event of a more subtle disruption, e.g. slowing the computer down, this link is used to restart the count down and may result in a more disabling disruption, for example, cause a reset.

It can be seen that two purposes of the owner of a business associated with supplying computers on a pay-per-use or other underwriter may be accomplished by the above method. First, if the TPM 322 is disabled because the user opted out of using the TPM 322 or hacked the computer to disable the TPM 322, messages to the watchdog circuit 330 will not be generated and the computer 110 will be disrupted.

Similarly, if the TPM 322 is enabled and operational, but the monitor is altered or replaced, possibly to alter or ignore the policies in effect (e.g. usage policies), the TPM will not honor the monitor requests. Practically, an altered monitor measurement is different than the measurement of the genuine monitor. Consequently, when the monitor measurement is stored into the TPM 322, it will allocate a set of keys and secrets respective and unique to the altered monitor, and different from those needed for operation of the GPIO 326. As a result any message from the altered monitor to the TPM to signal the GPIO 326 will not be honored. Therefore, the watchdog circuit 330 will not receive restart signals and the computer 110 will be disrupted.

In both cases, the TPM 322 must be enabled and the genuine monitor 314 must be in place and operational for correct operation of the computer 110.

Other uses for the above method and apparatus may be envisioned. For example, part of the boot process may require presentation of credentials by an authorized user. If correct credentials are not presented, the boot process may not load the genuine monitor, which will ultimately result in the disabling of the computer 110.

The invemtion claimed is:

1. A computer implementing a trusted computing base for enforcing operation of a monitor, the computer comprising:
   a processor for executing the monitor;
   a trusted environment coupled to the processor for ensuring execution of the monitor, the trusted environment adapted to receive a message from the monitor; and
   a watchdog circuit coupled to the trusted environment, comprising a timer for determining a period, the watchdog circuit disrupting the computer after the period, unless the trusted environment receives the message within the period, and the watchdog circuit receives a signed restart signal to restart the timer, when the signed restart signal is verified.

2. The computer of claim 1, wherein the trusted environment cryptographically identifies the monitor.

3. The computer of claim 1, wherein the trusted environment further comprises a general purpose input/output port and the monitor is given access to the general purpose input/output port after being cryptographically identified.

4. The computer of claim 1, wherein the trusted environment is coupled to the watchdog circuit via a dedicated communication link.

5. The computer of claim 1, wherein the watchdog circuit causes the computer to reboot when disrupting the computer.

6. The computer of claim 5, wherein a signal causing the computer to reboot is carried on a conductor, the conductor adapted for resistance to tampering.

7. The computer of claim 1, wherein the monitor verifies a token at least once in conjunction with sending the message.

8. The computer of claim 7, wherein the token comprises a version number for use by the monitor in determining whether the monitor is the current version.

9. A method of encouraging a known operating state in a computer comprising:
   executing a known monitor;
   sending a signal from the known monitor to a trusted environment before sending the signal to a watchdog circuit; and
   preventing the watchdog circuit from disrupting an operation of the computer responsive to the signal.

* * * * *

UNITED STATES PATENT AND TRADEMARK OFFICE
CERTIFICATE OF CORRECTION

| | | |
|---|---|---|
| PATENT NO. | : 7,360,253 B2 | Page 1 of 1 |
| APPLICATION NO. | : 11/021021 | |
| DATED | : April 15, 2008 | |
| INVENTOR(S) | : Alexander Frank et al. | |

It is certified that error appears in the above-identified patent and that said Letters Patent is hereby corrected as shown below:

In column 3, line 58, delete "152" and insert --152, --, therefor.

In column 3, line 64, delete "united" and insert -- limited --, therefor.

In column 4, line 28, delete "s" and insert -- is --, therefor.

Signed and Sealed this
Fifteenth Day of February, 2011

David J. Kappos
*Director of the United States Patent and Trademark Office*